United States Patent [19]

Bayer et al.

[11] 3,999,769

[45] Dec. 28, 1976

[54] TOOL HOLDER FOR MACHINE TOOLS

[76] Inventors: Jack L. Bayer, 1640 E. Bethany Home Road, Phoenix, Ariz. 85016; Walter J. Breitkopf, 7720 E. Heatherbray, Phoenix, Ariz. 85033

[22] Filed: Feb. 24, 1975

[21] Appl. No.: 552,292

[52] U.S. Cl. .............................. 279/1 B; 29/26 A; 279/82; 408/35; 408/238
[51] Int. Cl.² ........................................ B23B 31/12
[58] Field of Search ............ 279/1 B, 1 SG, 87, 89, 279/24, 28, 29, 82; 408/35, 238; 29/568, 26 A; 90/11 A

[56] References Cited

UNITED STATES PATENTS

| | | | |
|---|---|---|---|
| 2,868,551 | 1/1959 | Avellone et al. | 279/1 B |
| 2,990,189 | 6/1961 | Beers | 279/1 B |
| 3,599,996 | 8/1971 | Holt | 279/1 B |
| 3,612,552 | 10/1971 | Brundler | 279/1 B |
| 3,622,169 | 11/1971 | Koch et al. | 279/1 B |
| 3,722,363 | 3/1973 | Hague et al. | 279/1 B X |

FOREIGN PATENTS OR APPLICATIONS 1,135,267 8/1962 Germany .......................... 279/1 B

*Primary Examiner*—Othell M. Simpson
*Assistant Examiner*—W. R. Briggs

[57] ABSTRACT

A tool holder for machine tools particularly adapted for use in turret structures having a plurality of retainers for holding a plurality of such tool holders each carrying a different tool such as a drill, tap, reamer or other metal working tool. The disclosure relates to a mechanically actuated tool holder having mechanical locking means adapted to snap into annular retainers in a turret structure of a mechanical tool and wherein locking means alternately is operable to hold the tool holder in the turret retainer ring and to lock the tool holder onto an annular ledge of a stub means carried by a rotatable and reciprocable machine tool driving spindle. The structure being such that axial movement of the spindle causes said stub to pass into a recess in the tool holder body and to actuate detents so as to release the locking members to engage an annular ledge on the stub and thereby lock the tool holder body onto the stub and whereby inward movement of the locking members permits an annular sleeve to move axially of a tool holder and into surrounding relation therewith and to hold outer portions of the locking members inward so as to maintain locking engagement of the locking members with the annular ledge on the aforementioned stub carried by the tool driving spindle. The aforementioned sleeve being spring loaded so as to move into surrounding relation with the tool holder body and around the outer radially extending portions of the locking members; the sleeve also being actuated axially when engaged with the aforementioned turret retainer rings so as to uncover the outer ends of the locking members and to allow spring loaded detents to force the said locking members outward into locking engagement with an internal annular ledge of the aforementioned retainer ring structures. A recess in the tool holder body is concentric with its axis and a precisely fitted portion of the aforementioned stub makes a concentric precision fit with the tool holder body recess portion and an end of the spindle is precisely normal to its rotating axis and an end of the tool holder body is precisely normal to its axis of rotation and engageable with said end of said spindle and torque transmitting means interengages the tool holder body on the spindle so as to provide a rotary drive for the tool holder by means of the spindle.

10 Claims, 11 Drawing Figures

TOOL HOLDER FOR MACHINE TOOLS

BACKGROUND OF THE INVENTION

A prior art patent, U.S. Pat. No. 3,797,956, was issued to the inventors of the subject matter of the present application and said prior art patent utilized a draw bar in connection with the spindle for holding a tool holder in juxtaposition thereto and, consequently, each engagement of a tool holder with the driving spindle of the machine tool necessitated manual release of the draw bar to release the tool holder and subsequent tightening of the draw bar to connect another tool holder thereto.

Accordingly, it will be understood that the prior art patent disclosed a plurality of tool holders carried by a turret structure of a machine tool and each of the tool holders being juxtaposed in position for connection to the spindle of the machine, however, manual operation of the draw bar mechanism was required for each disconnection and subsequent connection relative to changing tool holders which carried different tools for successive machining operations.

SUMMARY OF THE INVENTION

The present invention relates to a tool holder for machine tools wherein a plurality of such tool holders may be supported in retainer rings on a turret means or tool holder device which is movable relative to the axis of the machine tool spindle so as to index various ones of several or a plurality of tool holders in axial alignment with the spindle so that the various tool holders may be changed relative to the spindle in order that various tools on the tool holders may be successfully used for machining operations to carry out various successive operations on various parts being machined. The present invention involves a simple mechanical means for displacing tool holders from retainer rings and concurrently connecting the tool holders to the spindle of the machine tool by simple axial movement of the machine tool into engagement with the tool holder which causes a stub on the spindle to be locked into a recess in the tool holder by locking members and whereby axial pressure of the spindle on the tool holder body causes it to be released from a retainer ring carried by the turret structure of the machine tool.

The tool holder of the invention is thus automatically and mechanically detached from the turret and attached to the spindle of the machine tool by axial movement of the machine tool spindle into engagement with the respective tool holder. Upon retraction of the spindle relative to the turret structure of the machine tool, the tool holder is automatically repositioned in a retainer ring in the turret and the spindle is automatically released therefrom by mechanical force of spindle retraction so that the spindle will be ready to engage another successive tool holder when the tool holder turret structure of the machine tool is moved relative to the axis of the spindle so as to dispose the desired tool holder in axial alignment with the spindle for successive tool holder engaging and connecting operation and concurrent removal of the tool holder from the turret holding ring by simple axial mechanical force of the machine tool spindle.

Specifically, a stub carried by the spindle of the machine comprises an annular ledge and this stub is forced into a central recess in the tool holder body and engages detent means which release locking members to slide radially inward and to engage with the annular ledge on the stub and spring loaded sleeve means is moved axially in surrounding relation with the tool holder body and retains outer ends of the locking members so as to hold the inner ends thereof in engagement with the annular ledge of the aforementioned stub. The locking members as well as the stub are provided with inclined portions which are inclined radially in directions toward the spindle and toward the axis of rotation thereof.

Upon retraction of a spindle and the tool holder toward the retainer ring carried by the machine tool turret, the aforementioned sleeve engages the retainer ring forcing it axially against compression of the aforementioned springs to expose the outer or first ends of the locking members and to allow them to be cammed outwardly by means of the inclined annular ledge on the stub such that the outer or first ends of the locking members are forced into engagement with an annular ledge in the turret supported retainer rings to thereby reposition the tool holder into the respective retainer ring and to release the stub of the spindle so that it can move out of the central recess of the tool holder after the locking members have move outwardly and disengaged from the annular ledge on the stub which also tends to cam the locking members radially outward as the spindle is retracted axially out of the central recess of the tool holder body.

Accordingly, it will be appreciated that the mechanical locking and unlocking mechanism of the present invention automatically locks and unlocks a tool holder relative to the spindle of the machine and relative to a retainer ring so that only axial movement is required for engaging and locking a respective tool holder and removing it from a retainer ring and for retracting the tool holder into an engaged supporting position with the tool holder retaining ring of the turret of the machine tool. Thus, no special manual attention is required for connecting and disconnecting a respective tool holder to the spindle of the machine tool thus saving a great amount of time when performing a plurality of successive machining operations on any part or piece of material being worked on.

Accordingly, it is an object of the present invention to provide a very simple, positive and accurate mechanical means for connecting and disconnecting a tool holder to a machine tool spindle by simple extension and retraction respectively of the machine tool spindle and using the force thereof to connect and disconnect various tool holders relative to the spindle during successive machining operations with different cutting tools carried by the various tool holders supported in connection with a turret or other movable tool holding device which carries a plurality of the tool holders.

Another object of the invention is to provide a tool holder which may be readily replaced without causing substantial down time of a machine tool relative to which it is used.

Another object of the invention is to provide a simple means by which wear or damage occurring between the spindle coupling stub and the tool holder body may be quickly obviated by replacing concentric structures of the stub and the tool holder body.

Another object of the invention is to provide a tool holder having means for locking it automatically onto a machine tool spindle stub or into a turret retainer ring of a machine tool and whereby sleeve means on the tool holder automatically holds locking means thereof in position so that the tool holder may be readily inserted into a sleeve in the machine tool turret when the tool holder is not engaged with a spindle coupling stub of the machine tool spindle.

Further objects and advantages of the invention may be apparent from the following specification, appended claims and accompanying drawings.

DESCRIPTION OF THE PREFERRED EMBODIMENTS

Figure 1:
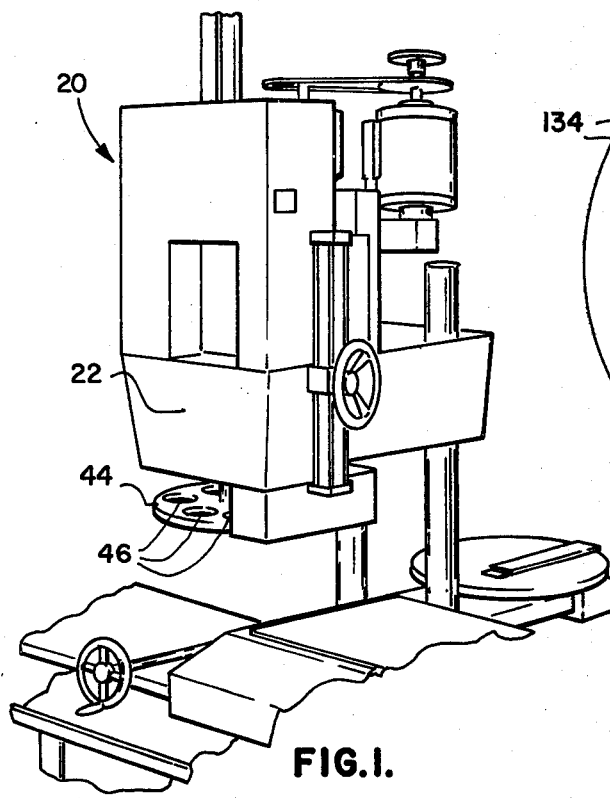
FIG. 1 is a fragmentary side elevational view of a machine tool such as disclosed in U.S. Pat. No. 3,639,071.
Figure 2:
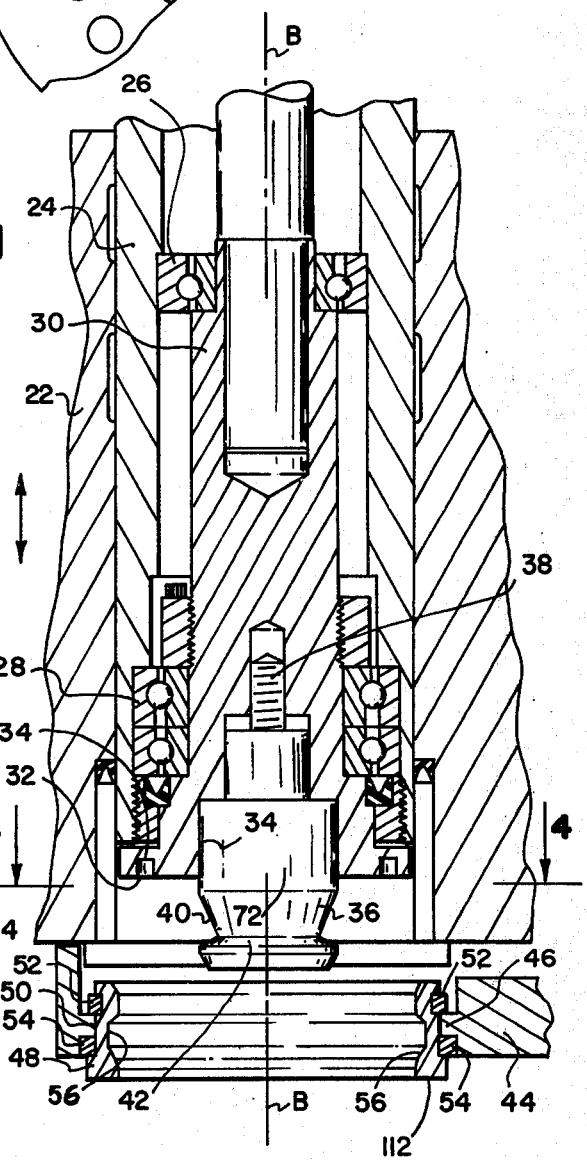
FIG. 2 is a fragmentary axial sectional view showing on a large scale the spindle and tool holder retaining ring structure as well as a portion of a turret structure of the present invention as it may apply to the machine tool shown in FIG. 1 of the drawings.

As shown in FIG. 1, a machine tool 20 is provided with a spindle supporting frame 22 in which a spindle sleeve 24 as shown in FIG. 2 of the drawings is reciprocally mounted to move in directions as indicated by the double ended arrow A and rotatably mounted in the sleeve 24 by means of bearings 26 and 28 is a tool driving spindle 30 which is provided with a tool holder engaging end 32. The end 32 is provided with a recess 34 wherein a tool holder coupling stub 36 is disposed. This stub 36 is provided with an externally screw threaded shank 38 which is screw threadably secured in the spindle 30. The stub 36 is annular in cross section and precisely fitted in the recess 34 so that it is precisely concentric with the bearings 26 and 28.

The tool holder coupling stub 36 is provided with an annular groove 40 having an annular inclined ledge portion 42 which converges toward the axis of rotation B of the spindle 30 and thus the ledge 42 is inclined toward the axis and also toward the end 32 of the spindle 30.

The machine tool 20 adjacent the frame 22 thereof is provided with a movable tool holder turret means 44 having a plurality of openings 46 in which tool holder retainer rings are mounted.

As shown in FIG. 2 of the drawings the turret plate 44 is disposed adjacent the spindle supporting frame 22 and disposed in one of the openings 46 is a tool holder retaining ring 48. This ring 48 is retained by an inwardly directed annular ledge 50 which is engaged by snap rings 52 and 54 which also engage the periphery of the tool holder retaining ring 48.

This tool holder retaining ring 48 is provided with an internal annular groove 54 having angularly inclined ledge structure 56 which will be hereinafter described in detail.

Figure 3:
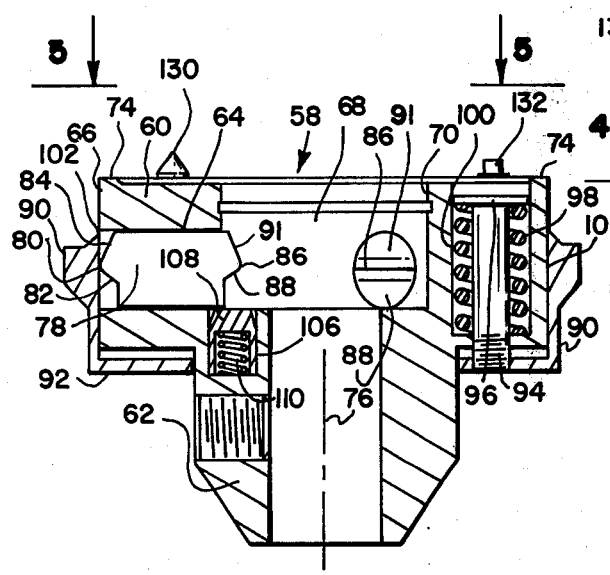
FIG. 3 is an axially sectional view of the tool holder of the present invention shown disconnected from a machine tool spindle or tool holder retainer ring.

The tool holder of the invention is designated 58 and is shown in FIG. 3 of the drawings. This tool holder 58 is provided with a body portion 60 having a tool holder portion 62 adapted to carry drills, taps, reamers or any other suitable tools as desired. The tool holder portion 62 may be of various configurations such as a colloped type chuck or any other suitable means for holding a tool for cutting various mterials such as metals, plastics or any material that is desirable to machines.

Figure 11:
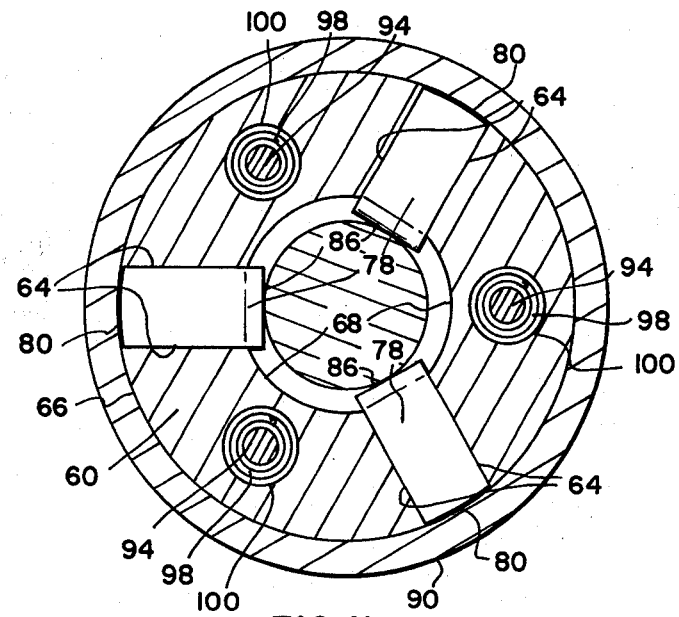
FIG. 11 is a sectional view taken from the line 11-11 of FIG. 10.

The tool holder body 60 as shown in FIGS. 3 and 11 is provided with a plurality of radially disposed guide means 64. This guide means being in the form of slots which extend radially and which communicate with an annular periphery 66 of the body 60. Additionally, the body 60 is provided with a central recess 68 adapted to receive the spindle coupling stub 36 hereinbefore described and shown in FIG. 2 of the drawings.

The recess 68 is provided with a precisely concentric close tolerance bore portion 70 adapted to be engaged and fitted precisely by an annular peripheral portion 72 of the stub 36 when inserted in the recess 68 as will be hereinafter described.

The end portion 32 of the spindle 30 is precisely normal to its axis of rotation and it is engageable with an annular end portion 74 of the tool holder body 60 and this annular portion 74 is precisely normal to the axis of rotation 76 of the tool holder body which is precisely concentric with the precision bore portions 70 hereinbefore described.

Reciprocally mounted in the guide slots 64 are locking members 78. Attention being directed to FIG. 11 wherein three of these locking members 78 are shown in the respective guide slots 64. Each locking member 78 as shown in FIG. 3 is provided with a first end 80 having an inclined cam surface 82 and another inclined cam surface 84. The locking member 78 is also provided with a second end 86 which is extendable into and out of the recess 68 for engagement with the annular ledge 42 of the spindle coupling stub 36. This second end 86 of each locking member 78 is provided with inclined cam surfaces 88 and 91 similar to the cam surfaces 82 and 84 on the first end 80 of each locking member 78.

Figure 8:
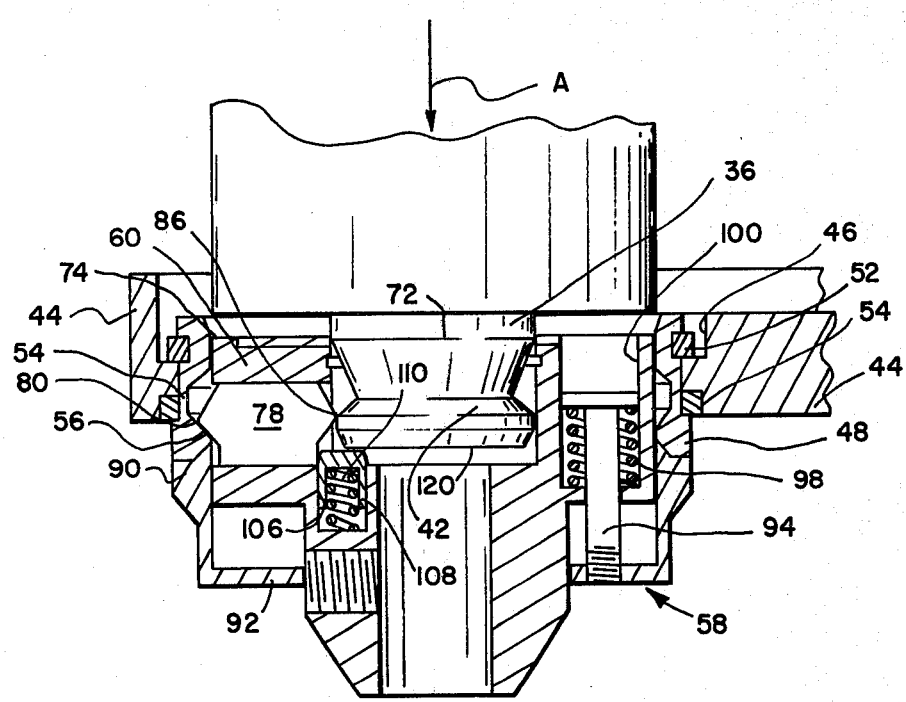
FIG. 8 is a view similar to FIG. 7 but showing a further progression of the spindle coupling stub moving into the aforementioned central recess of the tool holder body.
Figure 9:
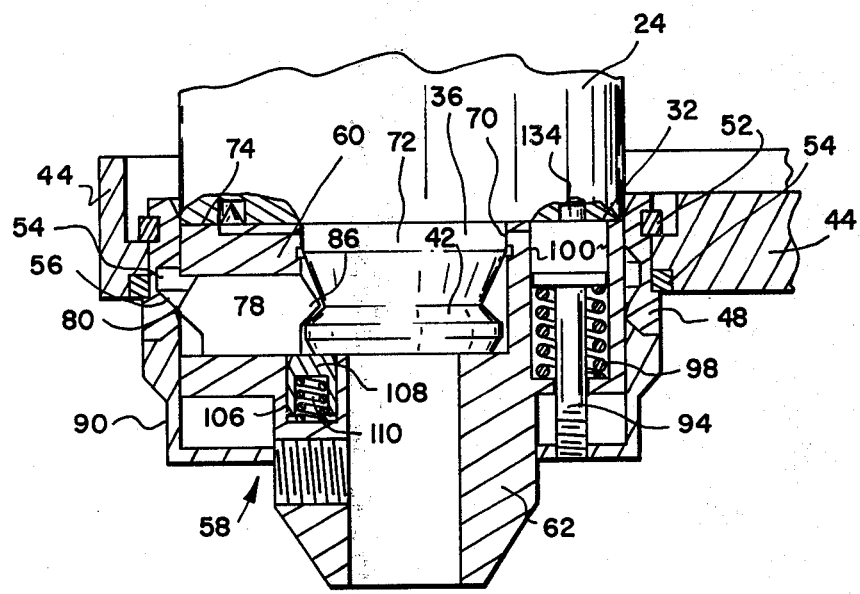
FIG. 9 is a view similar to FIG. 8 but showing a further progression of the spindle coupling stub moving into the recess in the tool holder of the invention and showing an end portion of the machine tool spindle precisely engaging an end of the tool holder.
Figure 10:
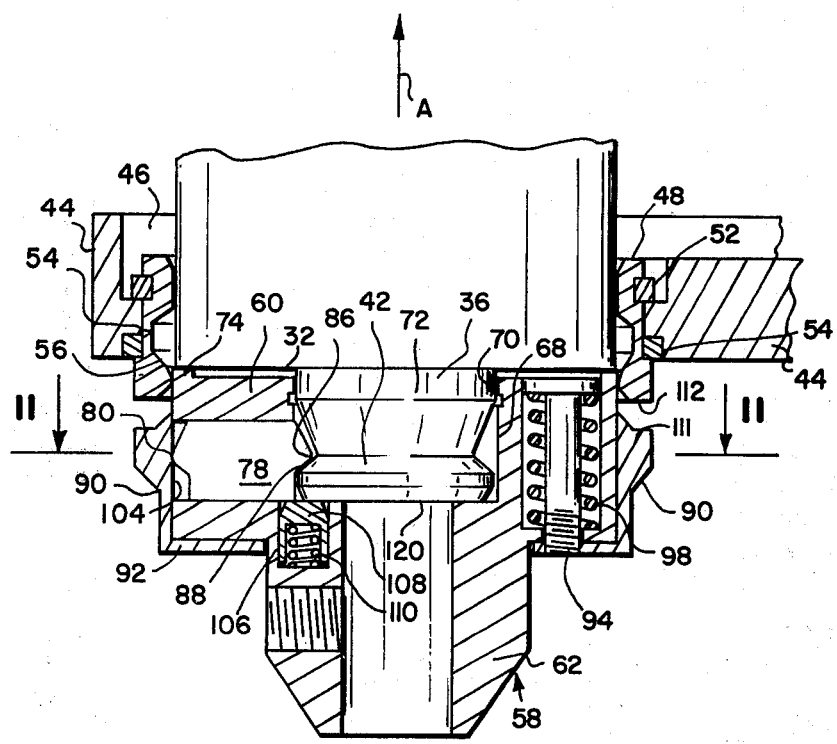
FIG. 10 is a view similar to FIG. 9 but showing a further progression of the machine tool spindle forcing the tool holder of the invention out of a tool holder retainer ring and into position for a machining operation with the tool holder of the invention locked to the spindle coupling stub carried by the spindle.

The cam surface 88 as shown in FIGS. 8, 9 and 10 of the drawings is engageable in a complemental manner with the inclined ledge 42 of the spindle coupling stub 36. The inclination of the inclined cam surface 88 of the locking member 78 is in a direction toward the axis of rotation 76 and also toward the end 74 of the tool holder body 60.

The cam surface 91 is inclined inwardly toward the axis of rotation 76 and also toward the tool holder portion 62 of the body 60.

The cam surface 82 on the outer or first end 80 of the locking member 78 is directed toward the periphery 66 of the body 60 and also generally toward the end 74 thereof.

The cam surface 84 is directed toward the periphery 66 but in a generally opposite direction toward the end of the body 60 from which the tool holding portions 62 projects.

An annular sleeve 90 surrounds the periphery 66 of the tool holder body 60 and this sleeve is provided with an end portion 92 which surrounds the tool holder portion 62 hereinbefore described. Secured to this portion 92 are bolts 94 which are provided with heads 96 engaging compression springs 98 which are contained in recesses 100 in the body 60. These springs 98 tend to retract the sleeve 90 in a direction toward the end 74 of the body 60 and to force the sleeve at its end portion 102 to act on the inclined surfaces 82 of the locking members 78 and to cam them inwardly toward the recess 68 to thereby dispose a bore portion 104 of the sleeve 90 in position to retain the end portions 80 of the locking members 78, all as shown best in FIG. 3 of the drawings.

Reciprocally mounted in recesses 106 in the body 74 are detents 108 which are engaged by springs 110 tending to force the detents in directions toward the end 74 of the body 60.

Figure 7:
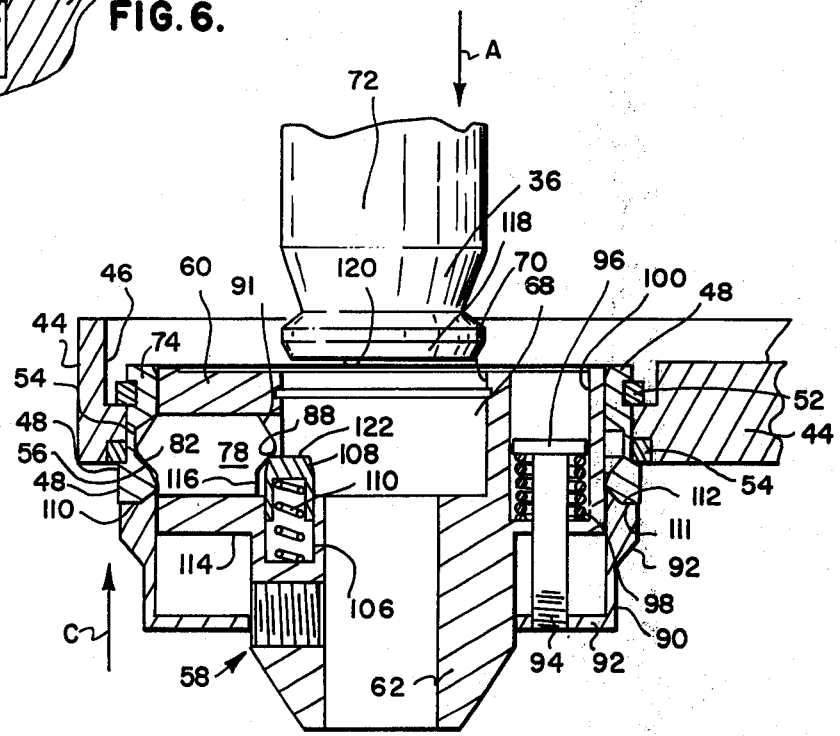
FIG. 7 is an axial sectional view of the tool holder as shown in FIG. 3 held in a retainer ring of a turret structure of a machine shown in FIG. 1 and showing fragmentarily a spindle coupling stub of the invention in position to be inserted in a central recess of the tool holder body of the invention.

Referring to FIG. 7 of the drawings, it will be seen that the tool holder as shown in FIG. 3 has been installed in one of the retainer rings 48 which are carried in the openings 46 of the turret plate 44.

The tool holder as shown in FIG. 3 is installed in a respective ring 48 by inserting the body 60 concentrically in the ring 48 and forcing the body in the direction of the arrow C such that the end portion 111 abuts a lower end portion 112 of the respective retainer ring 48. Continued upward force of the tool holder 58 in the direction of the arrow C causes the springs 98 to be compressed and the portion 92 of the sleeve 90 to be extended away from the adjacent portion 114 of the body 60. The locking members 78 are moved radially outward such that their inclined portions 82 engage the respective inclined ledge 56 of the retainer ring 48 and at this time the detents 108 are projected by their respective springs 110 in a direction toward the end 74 of the tool holder body 60 and in this position the respective detent 108 is adjacent to a respective inclined portion 88 of the respective locking member 78. Additionally, a respective side of the detent 108 is adjacent to a side portion 116 of the respective locking member 78 so as to retain it radially outward in position where the cam locking inclined surface 82 is held in engagement with the annular inclined ledge 56 of the retainer ring 48.

The spindle coupling stub 36 is provided with a converging annular end portion 118 which is complemental to the inclined cam surface portions 90 of the locking members 78 and when the spindle 30 is moved in the direction of the arrow A in FIG. 7 of the drawings, the converging end portion 118 of the stub 36 moves into the recess 68 in the tool holder body. A flat end 120 of the stub adjacent the annular converging portion 118 engages ends 122 of the detents 108 and forces them into the recesses 106 in the body 60 and out of interference with the side portions 116 of the locking members 78 whereupon continued force of the spindle 30 in the direction of the arrow A in FIG. 7 of the drawings causes the stub to progress into the position shown in FIG. 8 and then into the position shown in FIG. 9 wherein the detents 122 are completely depressed into the recesses 106.

During the movement in the direction of the arrow A as shown in FIG. 8 the inclined surfaces 82 of the locking members 78 slide inwardly on the inclined ledge 56 of the respective retainer ring 48 while the body 60 of the tool holder also starts to move in the direction of the arrow A and when the stub 36 progresses to the position shown in FIG. 9 of the drawings, the first ends 80 of the locking members 78 clear the ledge 56 of the respective retainer ring 48 and at this time the aforementioned end portion 32 of the spindle 30 comes into precise engagement with the end portions 74 of the tool holder body 60. It will be understood that this engagement provides for normality with the axis B of the spindle 30 and the axis 76 of the tool holder 58 while the peripheral portion 72 of the spindle coupling stub 36 precisely and concentrically fits into the precision bore portion 70 of the recess 68 in the tool holder body 60. Thus concentricity and axial normality of the tool holder 58 relative to the spindle is attained.

As the tool holder body 60 is progressively forced from the position shown in FIG. 9 to the position shown in FIG. 10, the bore portion 104 of the sleeve 90 cams itself under force of the springs 98 along the inclined portions 82 of the locking members 78 and around the outer or first ends 80 so as to force these locking members 78 inwardly into the recess 68 and into a firm cam engagement with the inclined ledge portion 42 of the stub 36 to thereby firmly lock the respective inclined portions 88 of the locking members upon the inclined ledge 42 to thereby hold the tool holder firmly in engagement at its end 74 with the respective end 32 of the spindle 30. Thus the sleeve 90 under compressive force of the springs 98 cam locks the tool holder body 60 by means of the locking members 78 to the stub 36 in connection with the spindle 30.

Upward movement of the spindle 30 in the direction of the arrow A as shown in FIG. 10 of the drawings may cause engagement of the upper end 110 of the sleeve 90 with a respective lower end 112 of the retainer ring 48 to thereby cause retraction of the tool holder body upwardly into the ring 48 and to compress the springs 98 such that the body 60 is retracted from the sleeve 90 and to permit the first ends of the locking members 78 to move outwardly along the inclined ledge 56 internally of the respective retainer ring 48 while concurrently moving the respective cam surface 88 of the respective locking member 78 out of engagement with the inclined ledge 42 of the stub 36 whereupon the stub 36 may be retracted from the respective recess 68 in the respective tool holder body 60 and in this manner the spindle coupling stub 36 may be completely detached from the respective tool holder 58 and it is concurrently automatically repositioned in a respective retainer ring ready for repositioning or subsequent disposition in an axial alignment with the spindle 34 reuse as hereinbefore described.

Figure 4:
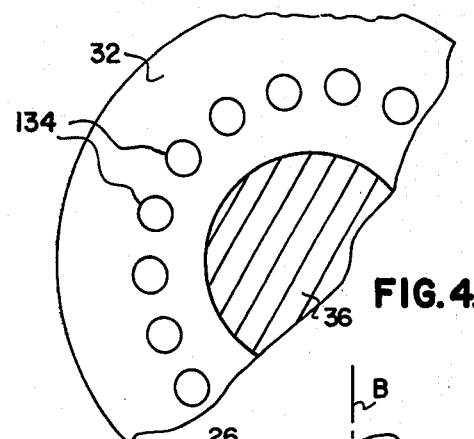
FIG. 4 is a fragmentary sectional view taken from the line 4—4 of FIG. 2 omitting the machine tool frame and merely showing the end of the machine tool spindle with the tool holder coupling stub in section.

As shown in FIGS. 3 and 4 of the drawings, spring loaded torque transmitting pins 130 project from the end 74 of the tool holder body. These pins are tapered and at least one pin 132 is generally cylindrical and these pins 130 and 132 are engageable in openings 134 in the end portion 32 of the spindle 30 as shown best in FIG. 4 of the drawings.

Figure 5:
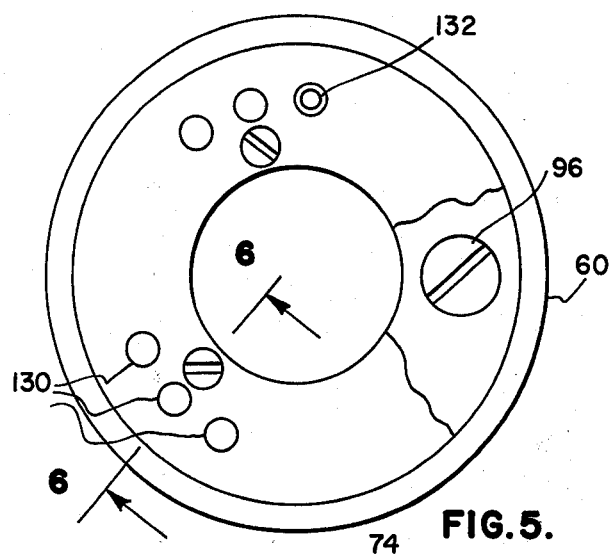
FIG. 5 is an end view of the tool holder taken from the line 5—5 of FIG. 3.
Figure 6:
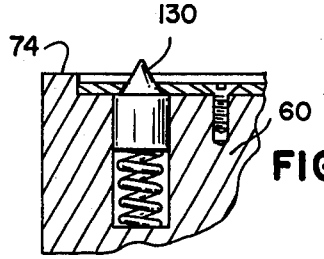
FIG. 6 is an enlarged fragmentary sectional view taken from the line 6—6 of FIG. 5.

Reference is hereby made to U.S. Pat. No. 3,797,956 and especially to FIG. 3, 4 and 5 of this patent and the related description which adequately describes the relationship of the pins 130 and 132 and the respective recesses 134 in the spindle 30, there being a differential number of recesses 134 and the pins 130 and 132, all as described in said U.S. Pat. No. 3,797,956. These pins 130 and 132 are disposed in shear in the recesses 134 and provide means for transmitting torque from the spindle 30 to the respective tool holder body 60.

It will, therefore, be understood that in the operation of the tool holder of the present invention it is automatically engaged with the spindle or reinstalled in the respective retainer ring 48 with axial movement of the spindle 30.

It will be obvious to those skilled in the art that various modifications may be resorted to without departing from the spirit of the appended claims.

We claim:

1. In a tool holder for machine tools the combination of: a rotary tool holding body member; said body member provided with first means for holding a tool such as a drill, a tap, reamer or the like; said body having an axis of rotation; said body having a central recess therein; said body having a peripheral portion; said body having a plurality of radially disposed guide means therein; said guide means each communicating with said peripheral portion and said central recess; a locking member radially and reciprocally mounted in each of said radially disposed guide means; each of said locking members moveable in a respective guide means to alternately project into said central recess and beyond said peripheral portion, each member having means alternately engageable with a retainer beyond said peripheral portion or may engage a spindle coupling stub in said central recess; a sleeve surrounding and axially moveable on said peripheral portion of said body, and when in locking position surrounding and holding said locking members inwardly in positions to engage a ledge on a spindle coupling stub in said recess; said sleeve when moved axially out of locking position permitting said locking members to move radially outward beyond said peripheral portion; said locking members are each provided with a first end directed radially outward and engageable by said sleeve; said locking members having second ends directed radially inward; a spring loaded detent means is moveably mounted in said body in each of said guide means; each detent means being moveable from one position to another and engageable with a respective second end of one of said locking members and, when said detent means is in one position thereby holding said locking members in position wherein said first ends thereof are projected beyond the periphery of said tool holder body; said detents disposed in said central recess and moveable in a direction parallel to said axis of rotation; said detents when disposed in said one position to be engaged by a spindle stub when inserted in said central recess, whereby said detents are moved out of engagement with said locking members by said stub when inserted into said central recess to thereby permit said locking members to move radially inward into engagement with said stub.

2. The invention as defined in claim 1, wherein: resilient means is carried by said body; said resilient means tending to move said sleeve into said locking position.

3. The invention as defined in claim 2, wherein: each of said locking members is provided with said first and second ends; each of said ends provided with cam surfaces angularly inclined to said axis of rotation; said first ends being operable to engage a complemental annular ledge in a turret supported retainer ring adjacent the periphery of said body; said second ends being operable to engage an annular ledge in the periphery of a spindle coupling stub, when positioned in said central recess of said body; said cam surfaces of said first and second ends being angularly inclined relative to said axis of rotation such that the angular inclination thereof is directed both laterally and axially relative to said axis of rotation.

4. The invention as defined in claim 3, wherein: an axially reciprocally movable rotary tool driving spindle is provided with an axis of rotation and an end portion; a spindle coupling stub fixed to said end portion and projecting therebeyond; said stub adapted to be inserted into said central recess of said tool holding body; said stub having an extending end and an external annular ledge portion engageable by said second ends of said locking members; said ledge portion of said stub provided with an inclined surface inclined toward said axis of rotation and in a direction away from said extending end of said stub.

5. The invention as defined in claim 4, wherein: a turret structure is disposed adjacent said end portion of said spindle; said turret structure having a plurality of tool holder retainers; said turret structure movable laterally relative to said rotary axis of said spindle and having means for indexing any one of said plurality of tool holder retainers in axial alignment with said rotary axis of said spindle; each of said tool holder retainers being generally ring shaped and having an internal annular ledge adapted to be engaged by said first ends of said locking members when projected beyond said peripheral portion of said body.

6. The invention as defined in claim 5, whereby said spindle is moved axially toward said tool holder body and said spindle carries said stub toward and into said central recess of said tool holder body while said tool holder body is held in one of said retainers, whereupon said stub engages said detents and moves them out of interference with said locking members, and whereupon continued axially force of said spindle causes said end of said spindle to exert force on said tool holder body which causes said inclined surfaces of said first ends of said locking members to cam inwardly relative to said ledge of a respective one of said retainers which thus causes said second ends of said locking members to engage said ledge of said stub and whereby said tool holder body is forced out of said respective retainer while said resilient means forces said sleeve to slide over said first ends of said locking members and to thereby hold them securely engaged with said ledge of said stub.

7. The invention as defined in claim 6, wherein said end portion of said spindle and said tool holder body have interlocking torque transmitting means allowing said spindle to transmit torque to said tool holder body.

8. The invention as defined in claim 1, wherein: a spindle is provided with an axis of rotation and is located to align with said tool holder body for driving it; a spindle coupling stub carried by said spindle and having a peripheral portion concentric with said last mentioned axis of rotation; said central recess having a bore portion sized precisely to fit said peripheral portion of said stub; said spindle having an annular end portion precisely normal to said last mentioned axis of rotation; said tool holder body having an annular surface precisely normal to its axis of rotation; said last mentioned annular surface sized precisely to be engaged by said annular end portion of said spindle.

9. The invention as defined in claim 1, wherein: said second ends of said locking members are provided with incline portions engageable by said spring loaded detent means; said spring loaded detent means engageable with and tending to force said first ends of said locking members radially outward beyond the periphery of said tool holder body whereby said sleeve when axially moved out of interference with said second ends of said locking members permits said second ends of said locking members to be engaged with an internal annular ledge of a machine held retainer means.

10. The invention as defined in claim 9, wherein: said sleeve is provided with an end portion engageable with a tool holder retainer ring; an annular axially stationary tool holder retainer ring engageable by said sleeve to force said sleeve out of interference with said second ends of said locking members; said tool holder retainer ring having an internal annular ledge and resilient means tending to hold said sleeve member in a direction to cover said second ends of said locking members whereby manual force may be used to insert said tool holder into a retainer ring and to axially force said sleeve out of interference with said second ends of said locking members to thereby allow them to be forced into engagement with said internal annular ledge of said retainer by cam action of said detent means.

* * * * *